(12) United States Patent
Kanoya et al.

(10) Patent No.: US 7,866,354 B2
(45) Date of Patent: Jan. 11, 2011

(54) HYDROGEN TANK FILLING STATION AND METHOD OF FILLING HYDROGEN TANK WITH HYDROGEN

(75) Inventors: Izuru Kanoya, Iruma-gun (JP); Mitsuya Hosoe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1086 days.

(21) Appl. No.: 11/602,527

(22) Filed: Nov. 21, 2006

(65) Prior Publication Data

US 2007/0113918 A1    May 24, 2007

(30) Foreign Application Priority Data

Nov. 22, 2005  (JP) .............................. 2005-336839

(51) Int. Cl.
*B65B 1/30* (2006.01)
(52) U.S. Cl. .............................. 141/95; 141/82; 141/83; 141/98; 141/387
(58) Field of Classification Search ...................... 141/2, 141/4, 82, 83, 94, 95, 98, 382, 387
See application file for complete search history.

(56) References Cited

U.S. PATENT DOCUMENTS

| | | | |
|---|---|---|---|
| 5,259,424 A * | 11/1993 | Miller et al. | 141/4 |
| 7,128,103 B2 * | 10/2006 | Mitlitsky et al. | 141/248 |
| 7,168,465 B2 * | 1/2007 | Mitlitsky et al. | 141/231 |
| 7,360,563 B2 * | 4/2008 | Mitlitsky | 141/2 |
| 7,377,294 B2 * | 5/2008 | Handa | 141/82 |
| 7,637,292 B2 * | 12/2009 | Handa | 141/82 |
| 2004/0108014 A1 | 6/2004 | Immel | |

FOREIGN PATENT DOCUMENTS

| | | |
|---|---|---|
| EP | 0936399 A1 | 8/1999 |
| EP | 1593905 A2 | 11/2005 |
| EP | 1803620 A1 | 7/2007 |
| JP | 2005-069332 | 3/2005 |
| WO | 03/060374 A1 | 7/2003 |

OTHER PUBLICATIONS

European Search Report for Applicatino No. 06255933.1, dated Feb. 4, 2010.

* cited by examiner

*Primary Examiner*—Timothy L Maust
(74) *Attorney, Agent, or Firm*—Nelson Mullins Riley & Scarborough LLP; Anthony A. Laurentano

(57) ABSTRACT

A hydrogen tank filling station includes a high-pressure hydrogen storage tank, a hydrogen supply nozzle for filling a hydrogen tank mounted on a vehicle with hydrogen from the high-pressure hydrogen storage tank, a hydrogen supply pipe, a holder stand for holding the hydrogen supply nozzle, a limit switch for detecting whether the hydrogen supply nozzle is held on the holder stand or not, a cooling system for cooling the hydrogen tank, and a valve controller for controlling a cooling operation performed by the cooling system on the hydrogen tank.

3 Claims, 9 Drawing Sheets

HYDROGEN TANK FILLING STATION AND METHOD OF FILLING HYDROGEN TANK WITH HYDROGEN

BACKGROUND OF THE INVENTION

1. Field of the Invention

The present invention relates to a hydrogen tank filling station as well as to a method of filling a hydrogen tank with hydrogen.

2. Description of the Related Art

Generally, a fuel cell, which generates electrical energy by an electrochemical reaction between hydrogen and oxygen, is supplied with hydrogen as a fuel from a hydrogen tank, which is located near the fuel cell and which stores hydrogen under a high pressure. When the amount of hydrogen that is stored in the hydrogen tank decreases, the hydrogen tank is connected to a high-pressure hydrogen storage tank, which stores hydrogen under a pressure higher than the hydrogen tank. Thus, the hydrogen tank is replenished with hydrogen supplied from the high-pressure hydrogen storage tank. Usually, hydrogen tanks, which are mounted on vehicles powered by fuel cells, are filled with hydrogen at hydrogen tank filling stations.

It is known in the art that when the hydrogen tank is filled with high-pressure hydrogen from the high-pressure hydrogen storage tank, the hydrogen inside the filled hydrogen tank generates heat. The temperature in the hydrogen tank immediately after filling the hydrogen tank is higher than the ambient temperature, and equals or exceeds +70° C., for example. An increased pressure of hydrogen inside the hydrogen tank immediately after filling the hydrogen tank also develops at the high temperature, due to the rise in temperature. Thereafter, when the temperature inside the hydrogen tank drops, so as to be near to the atmospheric temperature, the pressure of hydrogen inside the hydrogen tank also drops to a level that is lower than the hydrogen pressure immediately after completion of filling the hydrogen tank. When the above temperature rise occurs, therefore, the filled hydrogen tank is likely to suffer a shortage of hydrogen.

Japanese Laid-Open Patent Publication No. 2005-69332 discloses, as a method of reducing a temperature rise in the hydrogen tank when thus-filling a hydrogen tank with hydrogen, a hydrogen supply station having a supply pipe for supplying hydrogen to a hydrogen tank on a vehicle from a plurality of high-pressure hydrogen storage tanks, which store the hydrogen under a plurality of different pressure stages. The hydrogen supply station also has a cooling means disposed within the supply pipe for cooling hydrogen as it flows through the supply pipe. The temperature in the hydrogen tank is detected for enabling a feedback control. The hydrogen tank is filled with hydrogen, which is cooled by the cooling means, depending on the detected temperature inside the hydrogen tank.

According to the disclosed hydrogen supply station, the temperature inside the hydrogen tank is monitored and detected to enable a feedback control, so as to cause the cooling means to cool the hydrogen depending on the detected temperature, whereupon the hydrogen tank is filled with cooled hydrogen. Consequently, the number of components, such as the detecting means, valves, etc., tends to be large, and the control process therefor is complex.

SUMMARY OF THE INVENTION

It is a general object of the present invention to provide a hydrogen tank filling station as well as a method of filling a hydrogen tank with hydrogen, which employs a relatively simple control process that is performed when the hydrogen tank is filled with hydrogen.

A major object of the present invention is to provide a hydrogen tank filling station as well as a method of filling a hydrogen tank with hydrogen, which reduces a temperature rise inside the hydrogen tank when the hydrogen tank is filled with hydrogen, for thereby increasing the amount of hydrogen that fills the hydrogen tank.

According to an aspect of the present invention, there is provided a hydrogen tank filling station for filling a hydrogen tank with hydrogen, comprising a high-pressure hydrogen storage tank, a hydrogen supply nozzle for connection to the hydrogen tank and for filling the hydrogen tank with hydrogen from the high-pressure hydrogen storage tank, a hydrogen supply pipe connecting the hydrogen supply nozzle and the high-pressure hydrogen storage tank to each other, wherein hydrogen is supplied through the hydrogen supply pipe from the high-pressure hydrogen storage tank to the hydrogen supply nozzle, a holding means for holding the hydrogen supply nozzle, a detecting means mounted on the holding means for detecting whether the hydrogen supply nozzle is held by the holding means, a cooling means for cooling the hydrogen tank, and a control means for controlling the cooling means to perform a cooling operation on the hydrogen tank depending on a detected result from the detecting means.

With the above arrangement, when the hydrogen tank is filled with hydrogen from the high-pressure hydrogen storage tank, by means of a simple assembly, the detecting means and the control means are used to cool the hydrogen tank for thereby reducing a rise in temperature inside the hydrogen tank as the tank is being filled with hydrogen. The hydrogen tank can thus be filled with an increased amount of hydrogen.

If the hydrogen tank comprises a hydrogen tank mounted on a vehicle, then the cooling means should preferably be arranged so as to cool the hydrogen tank from a location beneath the vehicle. Therefore, even when the hydrogen tank on the vehicle is filled with hydrogen, a temperature rise inside the hydrogen tank can be reduced, and the hydrogen tank can be filled with an increased amount of hydrogen.

Preferably, the cooling means comprises a coolant ejecting means for ejecting a coolant toward the hydrogen tank, a coolant supply source for supplying the coolant to the coolant ejecting means, a coolant supply pipe connecting the coolant supply source and the coolant ejecting means to each other, wherein the coolant is supplied through the coolant supply pipe from the coolant supply source to the coolant ejecting means, and a valve connected to the coolant supply pipe, and wherein the control means further comprises a valve controller for controlling the valve to selectively open and close the coolant supply pipe. The coolant may comprise water or air. With this arrangement, the hydrogen tank filling station is highly simplified in structure, and a control process, which is performed for filling the hydrogen tank with hydrogen, is prevented from becoming complicated. Furthermore, a temperature rise inside the hydrogen tank is reduced, so that the hydrogen tank can be filled with an increased amount of hydrogen.

According to another aspect of the present invention, there is also provided a method of filling a hydrogen tank with hydrogen in a hydrogen tank filling station having a high-pressure hydrogen storage tank for storing hydrogen to fill the hydrogen tank, the hydrogen tank having a hydrogen pressure therein which is lower than a hydrogen pressure inside the high-pressure hydrogen storage tank, a hydrogen supply pipe connecting the high-pressure hydrogen storage tank and the hydrogen tank to each other, wherein hydrogen is supplied through the hydrogen supply pipe from the high-pressure hydrogen storage tank to the hydrogen tank, and a hydrogen nozzle that connects the hydrogen supply pipe to the hydrogen tank, the method comprising the steps of initiating cooling of the hydrogen tank with a cooling means for cooling the hydrogen tank, and thereafter, filling the hydrogen tank with hydrogen through the hydrogen supply nozzle, stopping filling of the hydrogen tank with hydrogen, and thereafter, stopping cooling of the hydrogen tank with the cooling means.

The step of initiating cooling of the hydrogen tank may further comprise the steps of removing the hydrogen nozzle from a holding means for holding the hydrogen supply nozzle, and thereafter, initiating cooling of the hydrogen tank with the cooling means. The respective steps of filling the hydrogen tank and stopping filling of the hydrogen tank may further comprise the steps of connecting the hydrogen supply nozzle to the hydrogen tank, filling the hydrogen tank with hydrogen through the hydrogen supply nozzle, and then stopping filling of the hydrogen tank with hydrogen. The step of stopping cooling of the hydrogen tank may further comprise the steps of removing the hydrogen supply nozzle from the hydrogen tank, thereafter holding the hydrogen supply nozzle with the holding means, and thereafter, stopping cooling of the hydrogen tank with the cooling means.

According to the above method, since the hydrogen tank is cooled as it is being filled with hydrogen from the high-pressure hydrogen storage tank, a temperature rise inside the hydrogen tank is reduced when the hydrogen tank is filled with hydrogen. Therefore, the hydrogen tank can be filled with an increased amount of hydrogen.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

A hydrogen tank filling station and a method of filling a hydrogen tank with hydrogen, according to preferred embodiments of the present invention, shall be described in detail below with reference to the accompanying drawings.

Figure 1:
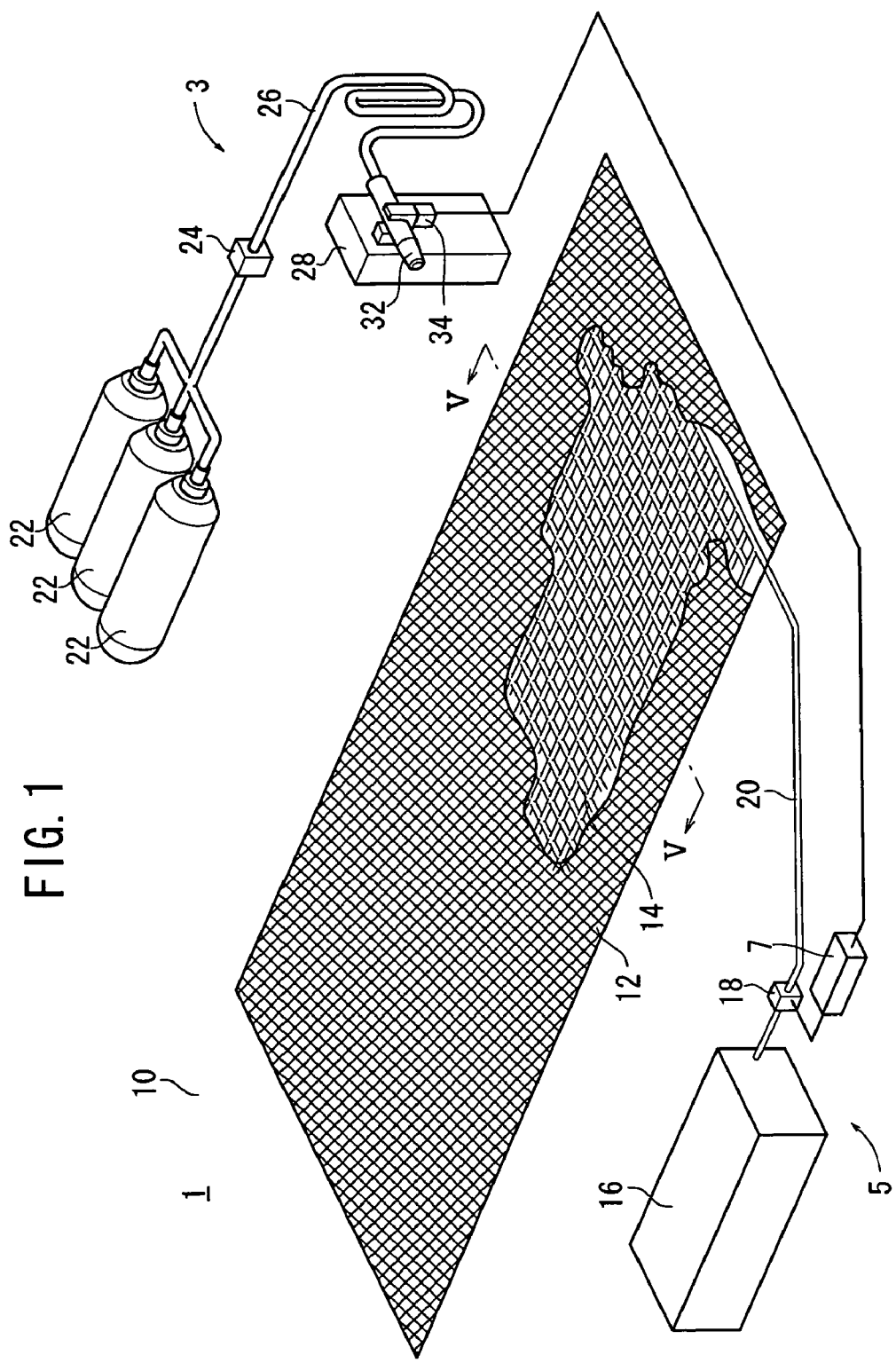
FIG. 1 is a perspective view of a hydrogen tank filling station according to an embodiment of the present invention.

FIG. 1 is a perspective view of a hydrogen tank filling station according to an embodiment of the present invention. The hydrogen tank filling station according to the present embodiment is for filling a hydrogen tank mounted on a fuel cell vehicle, with hydrogen.

As shown in FIG. 1, a hydrogen tank filling station 1 according to the present embodiment includes a vehicle placement space 10 for placing therein a fuel cell vehicle 100 (see FIG. 7), which carries a hydrogen tank 110 that is to be filled with hydrogen in the hydrogen tank filling station 1. The hydrogen tank filling station 1 includes a hydrogen supply system 3 for filling the hydrogen tank 110 on the fuel cell vehicle 100 positioned in the vehicle placement space 10, a cooling system 5 partially disposed in the vehicle placement space 10 and serving as a cooling means for cooling the hydrogen tank 110 on the fuel cell vehicle 100 that is positioned in the vehicle placement space 10, and a valve controller 7 serving as a control means for controlling the cooling system 5 in order to initiate or halt cooling of the hydrogen tank 110.

The fuel cell vehicle 100 is a vehicle propelled by a drive motor, not shown, that is energized by electric power produced as a result of an electrochemical reaction between hydrogen stored in the hydrogen tank 110 and oxygen obtained from the air. The hydrogen tank 110 may be of any structure capable of storing hydrogen, e.g., a tank for storing hydrogen under high pressure, a tank containing a hydrogen storage alloy for storing and discharging hydrogen, or a tank containing a hydrogen adsorbing material that is capable of adsorbing and discharging hydrogen, such as for example a complex, activated carbon, carbon nanotubes, amorphous carbon, graphite carbon, zeolite, or mesoporous silicate. In the illustrated embodiment, two hydrogen tanks 110 are disposed at a lower rear portion of the fuel cell vehicle 100 (see FIGS. 7 and 8).

The hydrogen supply system 3 comprises a high-pressure hydrogen storage tank 22 for storing hydrogen under a pressure that is higher than that of the hydrogen introduced into the hydrogen tank 110, a hydrogen supply pipe 26 for supplying hydrogen from the high-pressure hydrogen storage tank 22 to the hydrogen tank 110, a regulator 24 connected to the hydrogen supply pipe 26 in midstream for reducing the pressure of hydrogen supplied from the high-pressure hydrogen storage tank 22 to a predetermined pressure level, a hydrogen supply nozzle 32 connected to an end of the hydrogen supply pipe 26 on a secondary side (lower-pressure side) of the regulator 24 and which is detachably connected to the hydrogen tank 110, and a holder stand 28 serving as a holding means for holding the hydrogen supply nozzle 32 when not in use. In the illustrated embodiment, three high-pressure hydrogen storage tanks 22 having the same storage capacity are combined in a cradle, and the regulator 24 is connected to the hydrogen supply pipe 26, in midstream, to which outlet pipes of the high-pressure hydrogen storage tanks 22 are connected.

The hydrogen supply nozzle 32 has a tip end configured to be detachably connected to a hydrogen filler port, not shown, of the hydrogen tank 110 on the fuel cell vehicle 100. When the tip end of the hydrogen supply nozzle 32 is connected to the hydrogen filler port of the hydrogen tank 110, the high-pressure hydrogen storage tank 22 and the hydrogen tank 110 are connected to each other through the hydrogen supply pipe 26, so that the hydrogen tank 110 can be filled with hydrogen from the high-pressure hydrogen storage tank 22. The holder stand 28 serves to hold the hydrogen supply nozzle 32 when the hydrogen supply nozzle 32 is not in use, i.e., when the hydrogen tank 110 is not being filled with hydrogen. The holder stand 28 has a hook, not shown, for hooking the hydrogen supply nozzle 32 thereon. The holder stand 28 has a limit switch 34, which serves as a detecting means for detecting whether the hydrogen supply nozzle 32 is held on the holder stand 28. As described in detail later, the limit switch 34 is associated with the hook and is electrically connected to the valve controller 7. The limit switch 34 sends a signal to the valve controller 7, which indicates either removal of the hydrogen supply nozzle 32 from the holder stand 28 or mounting of the hydrogen supply nozzle 32 on the holder stand 28.

The cooling system 5, which is partially positioned within the vehicle placement space 10, ejects a coolant such as water or air onto the hydrogen tank 110 of the fuel cell vehicle 100 to thereby cool the hydrogen tank 110. The cooling system 5 comprises a coolant supply source 16, an ejector 14 serving as a coolant ejecting means for ejecting a coolant, which is pressurized and supplied from the coolant supply source 16, upwardly from a location beneath the fuel cell vehicle 100 that is positioned in the vehicle placement space 10, a coolant supply pipe 20 for supplying coolant from the coolant supply source 16 to the ejector 14, and a valve 18, which comprises a solenoid-operated valve, connected to the coolant supply pipe 20 in midstream for controlling the flow of coolant inside the coolant supply pipe 20. If the coolant is water, then the coolant supply source 16 comprises a water pipe, for example. If the coolant is air, then the coolant supply source 16 comprises an air compressor.

The valve 18 is electrically connected to the valve controller 7. The valve 18 is selectively opened and closed by the valve controller 7 based on a signal sent from the limit switch 34. When the valve 18 is opened, the coolant is ejected from the ejector 14 toward the hydrogen tank 110. When the valve 18 is closed, the coolant stops being ejected from the ejector 14 toward the hydrogen tank 110. Specifically, when the valve controller 7 is supplied with a signal (hereinafter referred to as an "on-signal") from the limit switch 34, which represents removal of the hydrogen supply nozzle 32 from the holder stand 28, the valve controller 7 opens the valve 18, and when the valve controller 7 is supplied with a signal (hereinafter referred to as an "off-signal") from the limit switch 34, which represents mounting of the hydrogen supply nozzle 32 on the holder stand 28, the valve controller 7 closes the valve 18.

Figure 2:
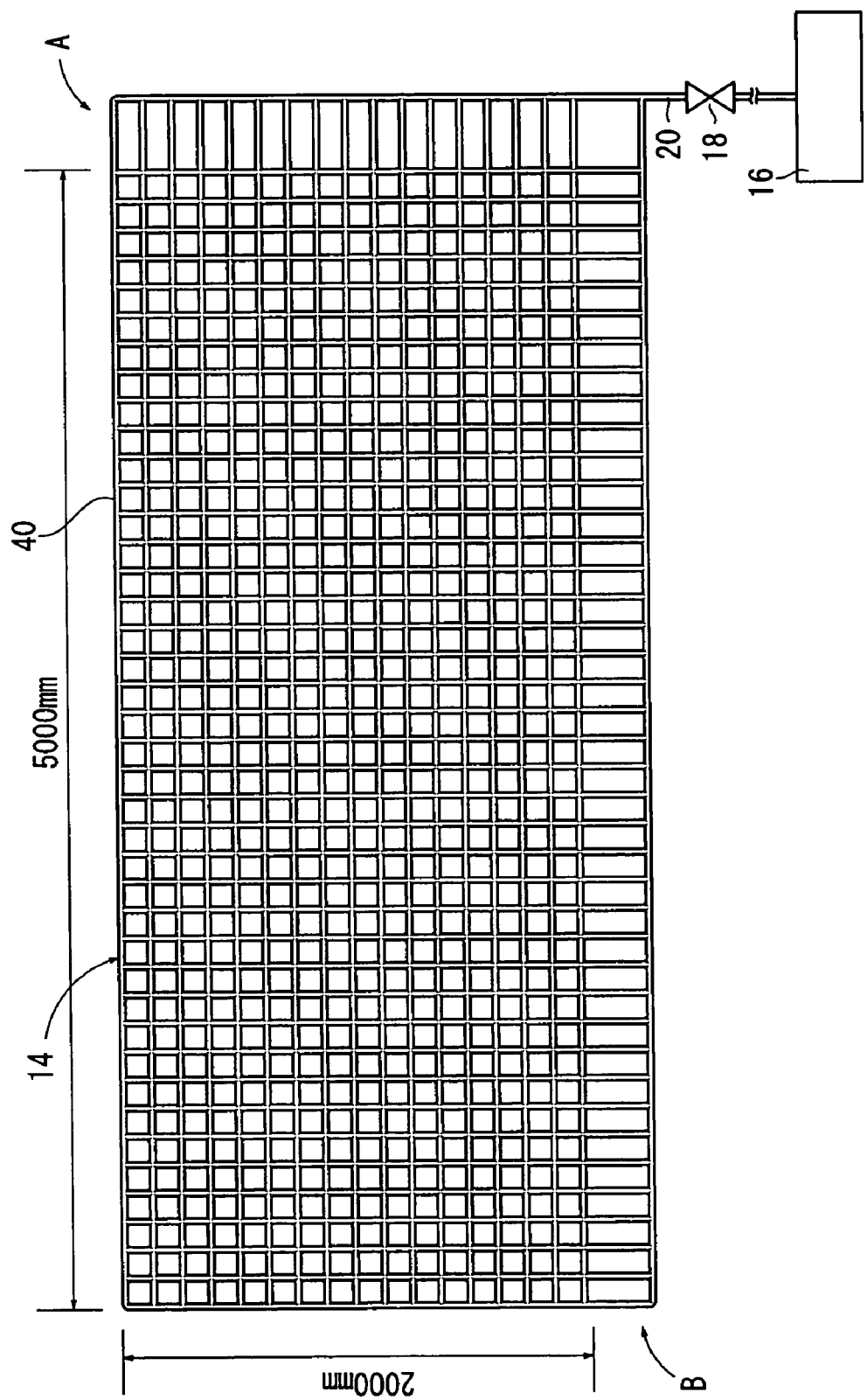
FIG. 2 is a plan view of an ejector of the hydrogen tank filling station shown in FIG. 1.

The ejector 14 shall be described in detail below with reference to FIGS. 2 through 5. FIG. 2 shows the ejector 14 in plan view. The ejector 14 comprises a network of crossing ejector pipes 40 communicating with the coolant supply pipe 20, and has a substantially rectangular shape as a whole. The ejector 14 has a size large enough to sufficiently cool the hydrogen tank that is mounted on an ordinary fuel cell vehicle. In the present embodiment, the ejector 14 has a width of about 2000 mm and a length of about 5000 mm. The ejector 14 has a plurality of ejection ports 42 (see FIGS. 3 and 4) disposed respectively at locations where the ejector pipes 40 cross each other. The ejection ports 42 are positioned at spaced intervals ranging from 50 to 200 mm in both transverse and longitudinal directions of the ejector 14. The ejector 14 includes marginal portions A, B disposed on transverse and longitudinal edges thereof where the ejector pipes 40 are joined to the coolant supply pipe 20. In the marginal portions A, B, the ejector pipes 40 are branched from the coolant supply pipe 20, for creating a uniform flow of coolant within the ejector pipes 40.

Figure 3:
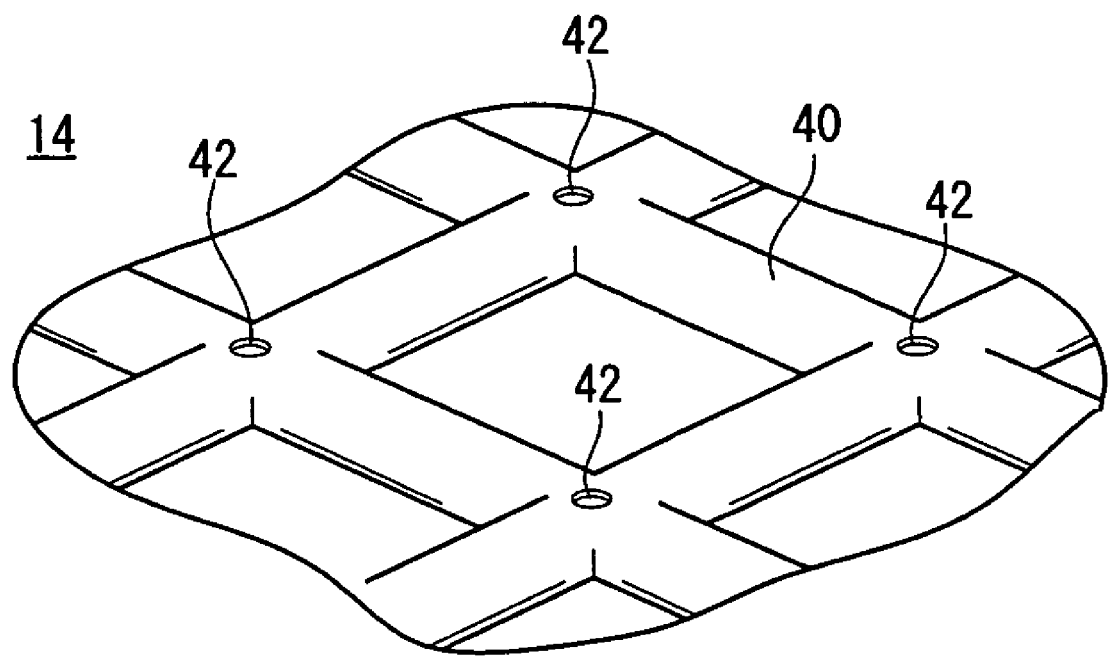
FIG. 3 is an enlarged fragmentary perspective view of a portion of the ejector where ejector pipes cross each other in a crisscross pattern.
Figure 4:
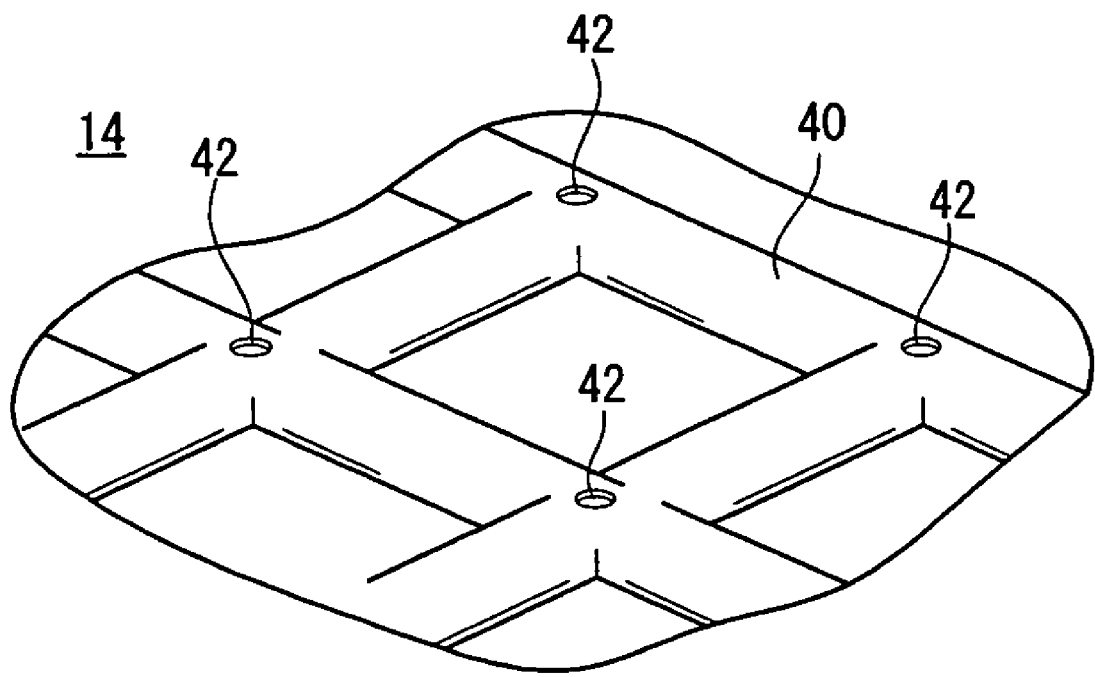
FIG. 4 is an enlarged fragmentary perspective view of an edge portion of the ejector where the ejector pipes cross each other.

FIG. 3 is an enlarged fragmentary perspective view of a portion of the ejector 14 showing where the ejector pipes 40 cross each other in a crisscross pattern. FIG. 4 is an enlarged fragmentary perspective view of an edge portion of the ejector 14 where the ejector pipes 40 cross each other. As shown in FIGS. 3 and 4, since the ejection ports 42 are positioned respectively at locations where the ejector pipes 40 cross each other, the coolant can be ejected uniformly toward the vehicle from the ejector 14 in both transverse and longitudinal directions thereof. Therefore, even if the fuel cell vehicle 100 is shifted slightly out of position in the vehicle placement space 10, or if the fuel cell vehicle 100 has a different size, the ejector 14 can still reliably cool the hydrogen tank 110.

Figure 5:
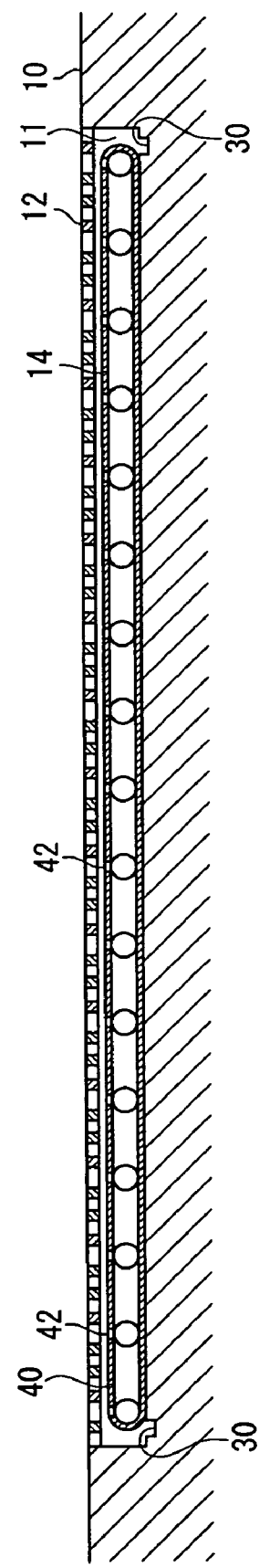
FIG. 5 is a cross-sectional view taken along line V-V of FIG. 1.

FIG. 5 is a cross-sectional view taken along line V-V of FIG. 1, and shows the ejector 14 laid within the vehicle placement space 10. As described above, the ejector 14 comprises the network of ejector pipes 40. If the ejector 14 were placed directly on the ground, then the fuel cell vehicle 100 could potentially be driven onto the ejector 14, possibly damaging the ejector 14 or making the fuel cell vehicle 100 itself unstable.

According to the present embodiment, as shown in FIG. 5, a recess 11, which is capable of housing the ejector 14 therein, is defined in the vehicle placement space 10, and the ejector 14 is laid within the recess 11. The recess 11 is covered with a mesh-like metal lid 12, which allows the coolant ejected from the ejector 14 to pass therethrough and which is strong enough to withstand the weight of the fuel cell vehicle 100. The ejector 14, which is protected by the mesh-like metal lid 12, is capable of ejecting coolant toward the hydrogen tank 110 from a location beneath the fuel cell vehicle 100 that is placed on the mesh-like metal lid 12. Drainage slots 30 are defined in the bottom of the recess 11 for discharging coolant that has been used.

Figure 6:
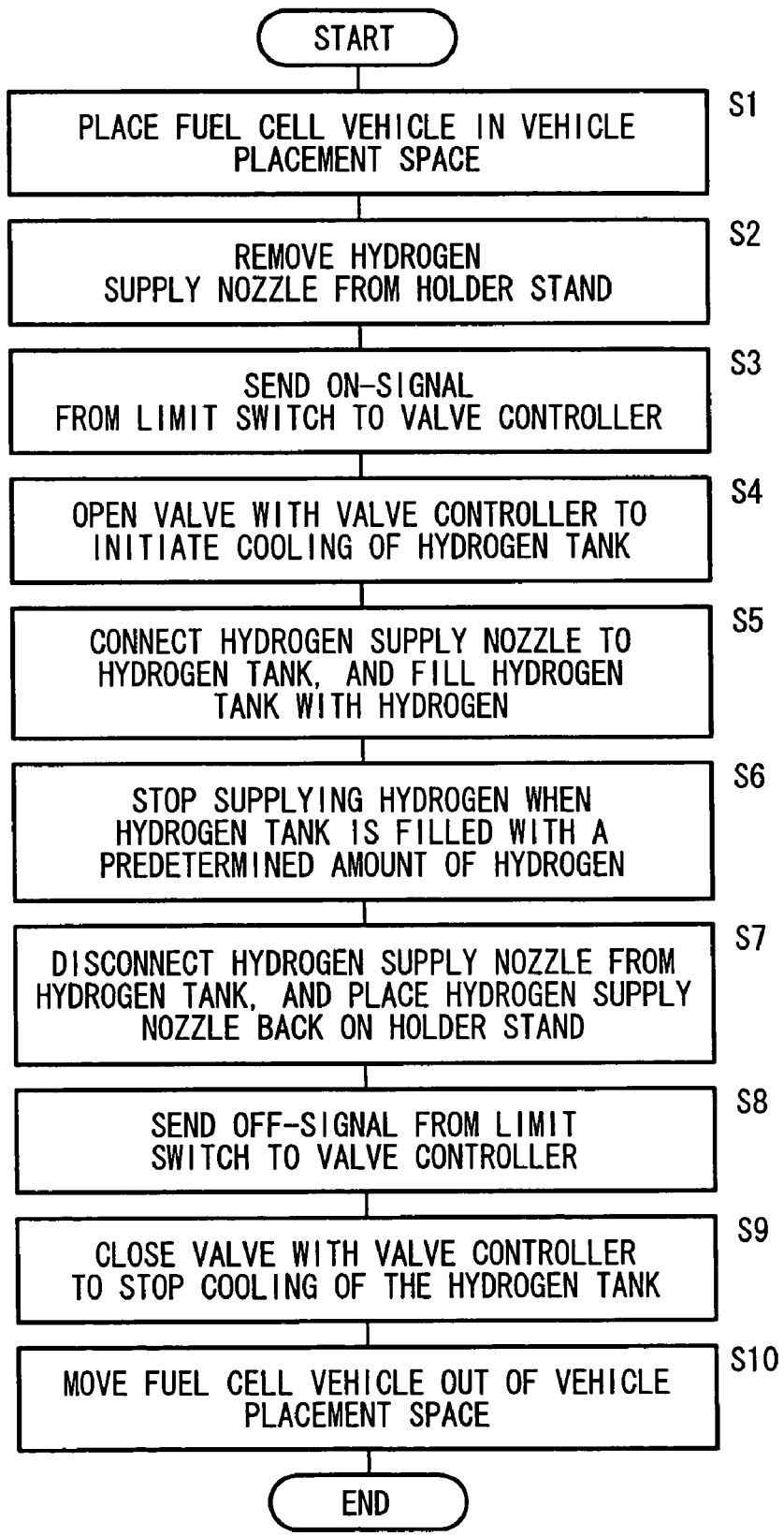
FIG. 6 is a flowchart of an operation sequence of a hydrogen tank filling method according to an embodiment of the present invention.

A method of filling the hydrogen tank 110 on a fuel cell vehicle 100 placed in the vehicle placement space 10 with hydrogen in the hydrogen tank filling station 1, which is constructed as described above, shall be described below with reference to FIGS. 6 through 8. FIG. 6 is a flowchart indicating an operation sequence of the hydrogen tank filling method. The operation sequence is carried out in the order of the step numbers shown in FIG. 6.

Figure 7:
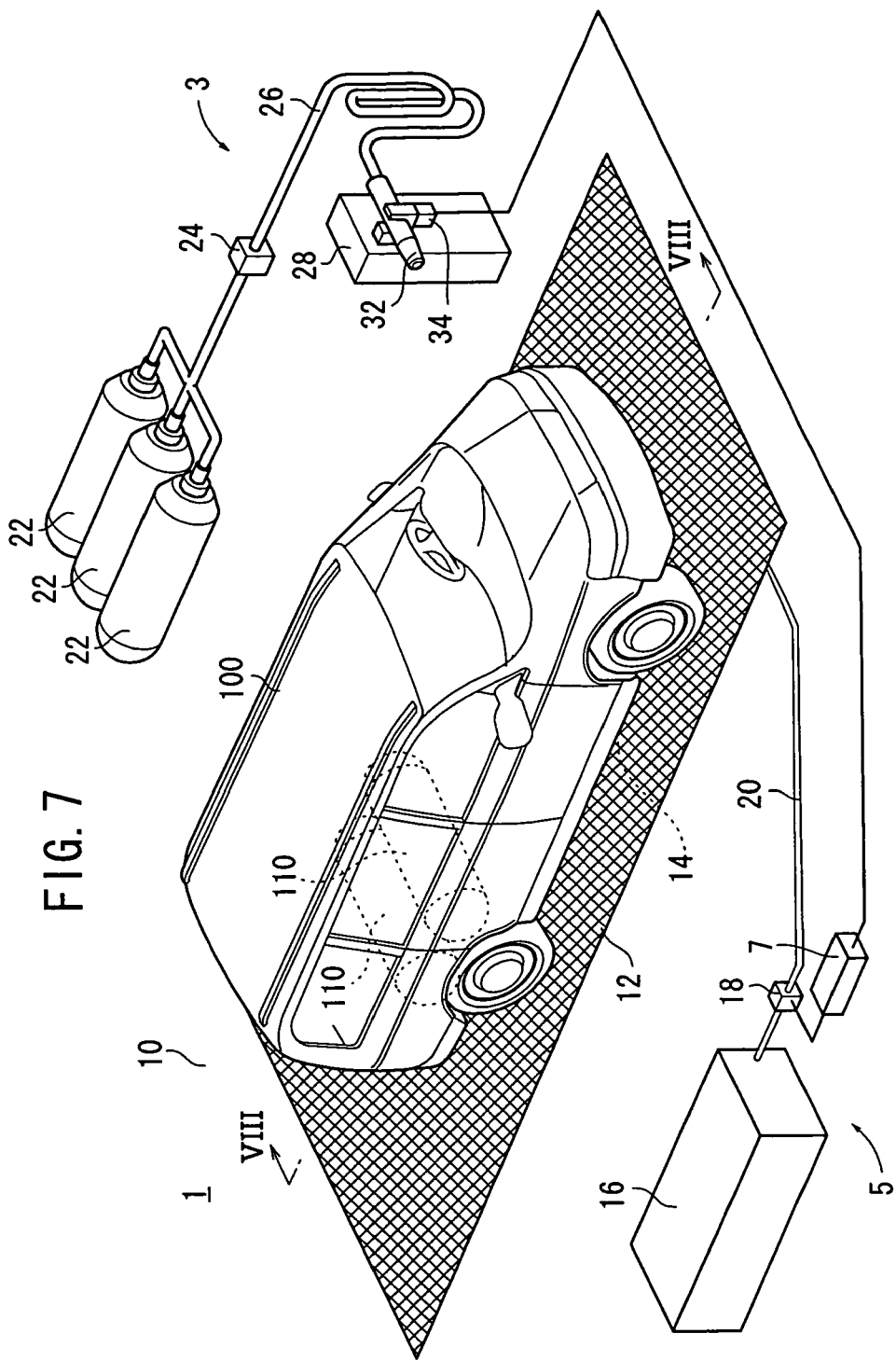
FIG. 7 is a perspective view showing the manner in which a fuel cell vehicle is placed on the hydrogen tank filling station shown in FIG. 1.
Figure 8:
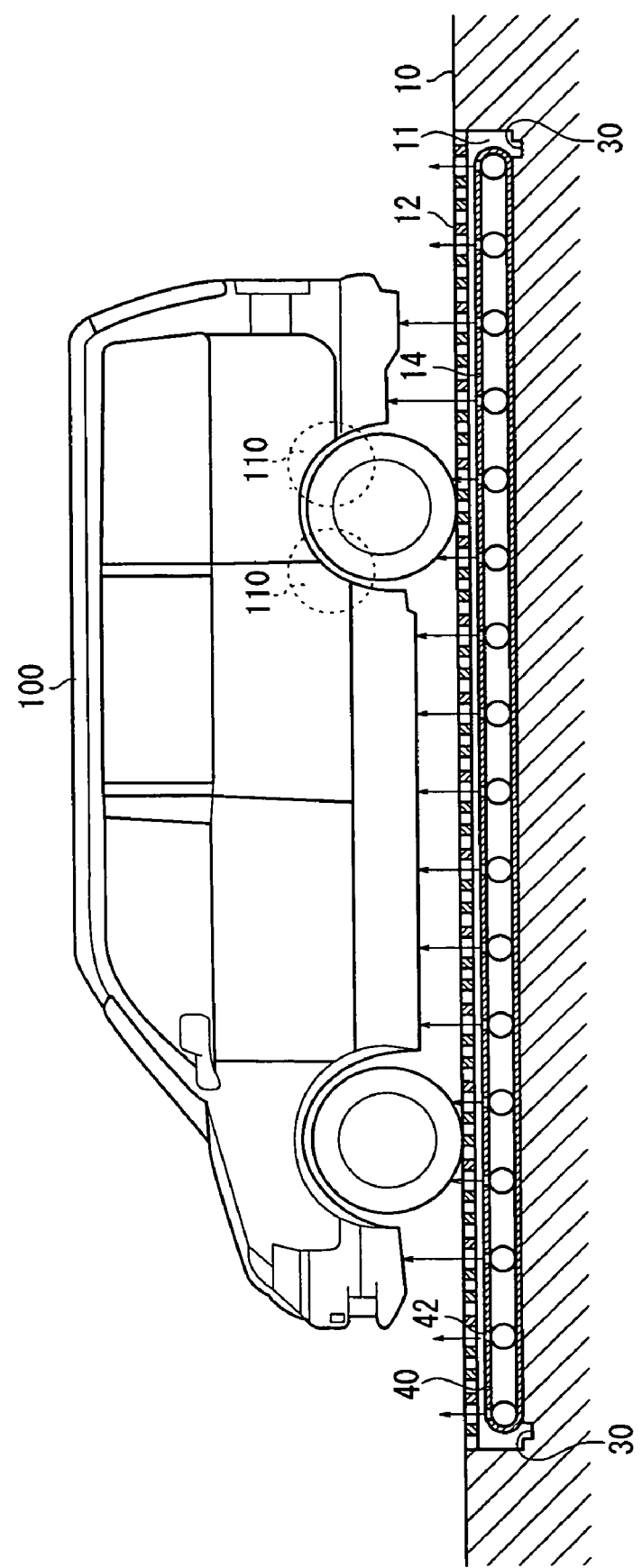
FIG. 8 is a cross-sectional view taken along line VIII-VIII of FIG. 7.

In step S1 shown in FIG. 6, the fuel cell vehicle 100 is placed in the vehicle placement space 10 at a position above the ejector 14, as shown in FIG. 7. Since the ejector 14 is of a size large enough to sufficiently cool the hydrogen tank that is mounted on an ordinary fuel cell vehicle, the hydrogen tank 110 can reliably be cooled even if the fuel cell vehicle 100 is shifted slightly out of position in the vehicle placement space 10.

In step S2, the hydrogen supply nozzle 32 is removed from a non-illustrated hook of the holder stand 28.

In step S3, the limit switch 34 sends a signal indicating removal of the hydrogen supply nozzle 32 from the holder stand 28, i.e., an on-signal, to the valve controller 7.

In step S4, the valve controller 7 opens the valve 18. As shown in FIG. 8, coolant supplied from the coolant supply source 16 is supplied through the coolant supply pipe 20 and is ejected upwardly from the ejection ports 42 of the ejector 14 onto the underside of the fuel cell vehicle 100. Therefore, each of the hydrogen tanks 110, which are mounted in a lower portion of the fuel cell vehicle 100, begins to be cooled by the ejected coolant. In FIG. 8, the coolant is indicated by the arrows extending upwardly from the ejection ports 42.

In step S5, the hydrogen supply nozzle 32 is connected to the non-illustrated hydrogen filler port of the hydrogen tank 110 on the fuel cell vehicle 100, whereupon the hydrogen tank 110 starts to be filled with hydrogen. Hydrogen supplied under high pressure from the high-pressure hydrogen storage tank 22 is depressurized by the regulator 24 and supplied to the hydrogen tank 110.

In step S6, the hydrogen tank 110 is filled with hydrogen up to a predetermined pressure, at which point the supply of hydrogen to the hydrogen tank 110 is stopped. While the hydrogen tank 110 is being filled with hydrogen, the coolant is continuously ejected from the ejector 14 in order to cool the hydrogen tank 110. Consequently, the temperature inside the hydrogen tank 110 is prevented from rising while the hydrogen tank 110 is being filled with hydrogen.

In step S7, the hydrogen supply nozzle 32 is disconnected from the hydrogen filler port of the hydrogen tank 110, and placed back on the hook of the holder stand 28.

In step S8, the limit switch 34 sends a signal, i.e., an off-signal, to the valve controller 7, which indicates that the hydrogen supply nozzle 32 has been mounted on the holder stand 28.

In step S9, the valve controller 7 closes the valve 18. The coolant stops being ejected from the ejector 14, thereby stopping cooling of the hydrogen tank 110.

When filling of the hydrogen tank 110 with hydrogen has been completed through the above steps, the fuel cell vehicle 100 is moved off from the vehicle placement space 10 in step S10. If a hydrogen tank on another vehicle is required to be filled with hydrogen, then the above operation sequence is repeated in order to fill the hydrogen tank with hydrogen.

According to the above hydrogen tank filling method of the present embodiment, which is performed by the hydrogen tank filling station 1, a simple control process utilizing the limit switch 34 and the valve controller 7 can be performed in order to fill the hydrogen tank 110 with a sufficient amount of hydrogen, while reducing a rise in temperature inside the hydrogen tank 110 as it is being filled with hydrogen.

An inventive example, in which the hydrogen tank filling method performed by the hydrogen tank filling station 1 was applied, shall be described below together with a description of a comparative example. It shall be understood, however, that the present invention is not necessarily limited to the illustrated inventive example.

In the inventive example, the hydrogen pressure in the high-pressure hydrogen storage tank 22 of the hydrogen supply system 3 was 42 MPa, and hydrogen supplied from the high-pressure hydrogen storage tank 22 was depressurized by the regulator 24 to 35 MPa and supplied to the hydrogen tank 110 on the fuel cell vehicle 100. On the holder stand 28, the hydrogen supply nozzle 32 was fixed by a hook combined with the limit switch 34.

The ejector 14 of the cooling system 5 had a network of crossing ejector pipes 40, as shown in FIGS. 2 through 4, with an overall width of about 2000 mm and a length of about 5000 mm. Each of the ejector pipes 40 had an outside diameter of 20 mm and an inside diameter of 18 mm. The ejector 14 included a total of 1071 ejection ports 42, at spaced intervals of 100 mm, in both the transverse and longitudinal directions thereof. Each of the ejection ports 42 had a diameter of 1 mm. The coolant was tap water pressurized at 0.2 MPa, which was supplied from the coolant supply source 16. The valve 18 comprised a solenoid-operated valve.

The fuel cell vehicle 100 included two hydrogen tanks 110 disposed on a lower rear portion thereof. Each of the hydrogen tanks 110 had a thermocouple, serving as a temperature measuring means, for measuring the temperature inside the hydrogen tank 110. The fuel cell vehicle 100 was placed in the vehicle placement space 10, at a position over the ejector 14. When the hydrogen supply nozzle 32 was removed from the hook of the holder stand 28, the valve controller 7 opened the valve 18, thereby allowing the coolant tap water to be ejected from the ejector 14 toward the hydrogen tanks 110, to initiate cooling of the hydrogen tanks 110.

Figure 9:
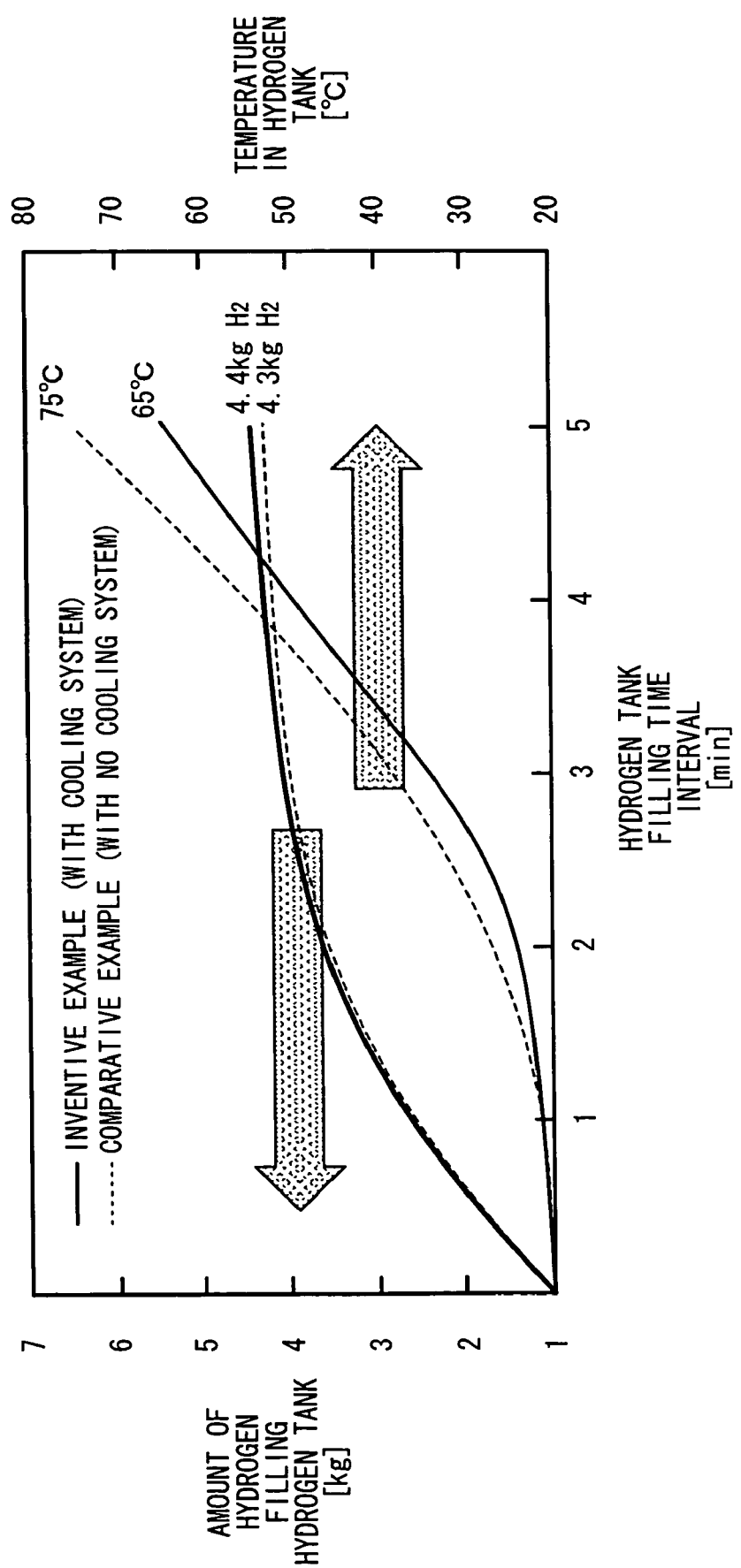
FIG. 9 is a graph showing temperature changes inside of hydrogen tanks and the amounts of hydrogen that have filled the hydrogen tanks, with respect to a hydrogen tank filling time interval when the hydrogen tanks are filled with hydrogen, in relation to both inventive and comparative examples.

Then, the hydrogen supply nozzle 32 was connected one at a time to each of the hydrogen tanks 110, and began filling the hydrogen tank 110 with hydrogen. The hydrogen tank 110 was filled with hydrogen until the hydrogen pressure inside the hydrogen tank 110 reached 35 MPa. Changes in the amount (kg) of hydrogen supplied to the hydrogen tank 110, as well as the temperature (° C.) inside the hydrogen tank 110 during a filling time interval of the hydrogen tank, are shown in FIG. 9. According to a comparative example, a fuel cell vehicle that was identical to the fuel cell vehicle 100 was employed, and the hydrogen tank 110 on the fuel cell vehicle was filled with hydrogen in a hydrogen tank filling station, which had a hydrogen supply system identical to the hydrogen supply system 3 but which did not have the cooling system 5, until the hydrogen pressure in the hydrogen tank 110 reached 35 MPa. FIG. 9 also shows changes in the amount (kg) of hydrogen that was supplied to the hydrogen tank 110, as well as the temperature (° C.) inside the hydrogen tank 110 during a filling time interval of the hydrogen tank, according to the comparative example.

In FIG. 9, the horizontal axis represents the hydrogen tank filling time interval (min.), the left vertical axis represents the amount (kg) of hydrogen supplied to the hydrogen tank 110, and the right vertical axis represents the temperature (° C.) inside the hydrogen tank 110. The solid-line curves show measured results pertaining to the inventive example, whereas the broken-line curves show measured results pertaining to the comparative example. In both the inventive and comparative examples, the hydrogen tank filling time interval was about 5 minutes, until the hydrogen pressure inside the hydrogen tank 110 reached 35 MPa. It can be seen from FIG. 9 that the temperature inside the hydrogen tank 110 was +65° C. after the hydrogen tank 110 was filled according to the inventive example, whereas the temperature inside the hydrogen tank 110 was +75° C. after the hydrogen tank 110 was filled according to the comparative example. The amount of hydrogen supplied to the hydrogen tank 110 was 4.4 kg according to the inventive example, whereas the amount of hydrogen supplied to the hydrogen tank 110 was 4.3 kg according to the comparative example.

It shall be understood, according to the inventive example employing the cooling system 5, that the temperature inside the hydrogen tank 110 filled with hydrogen was lower, and thus the hydrogen tank 110 was filled with more hydrogen than in the case of the comparative example, which did not use the cooling system 5.

A preferred embodiment of the present invention has been described above. However, the present invention is not limited to the illustrated embodiment, and various changes and modifications may be made to the described embodiment without departing from the scope of the invention.

Examples of such changes and modifications shall be described below. In the illustrated embodiment, the hydrogen tank 110 on the fuel cell vehicle 100 is filled with hydrogen supplied from the high-pressure hydrogen storage tank 22. However, the present invention is also applicable to a system in which the cooling system 5 is laid in close proximity to the high-pressure hydrogen storage tank 22, wherein the high-pressure hydrogen storage tank 22 is filled with hydrogen from a mobile high-pressure hydrogen storage tank, such as a hydrogen tank carriage trailer (not shown), or with hydrogen generated from natural gas (not shown) or the like by a gas modifier and supplied through a compressor, while the high-pressure hydrogen storage tank 22 is cooled by the cooling system 5.

The limit switch 34 may be mounted on the hydrogen supply nozzle 32, rather than on the holder stand 28, or may be mounted on both the holder stand 28 and the hydrogen supply nozzle 32. Depending on how the hydrogen supply nozzle 32 is used, the limit switch 34 may be replaced with a manual switch or the like. In cold climates, the coolant should preferably be air rather than water. Alternatively, water and air may selectively be used as the coolant during the summer season with higher temperatures and during the winter season with lower temperatures.

The ejector 14 may be placed directly on the ground, depending on how the cooling system 5 is used, as well as where the cooling system 5 is installed.

Although certain preferred embodiments of the present invention have been described above, it should be understood that various changes and modifications may be made without departing from the scope of the invention as set forth in the appended claims.

What is claimed is:

1. A hydrogen tank filling station for filling a hydrogen tank with hydrogen, comprising:
    a high-pressure hydrogen storage tank;
    a hydrogen supply nozzle for connection to said hydrogen tank and for filling said hydrogen tank with hydrogen from said high-pressure hydrogen storage tank;
    a hydrogen supply pipe connecting said hydrogen supply nozzle and said high-pressure hydrogen storage tank to each other, wherein hydrogen is supplied through said hydrogen supply pipe from said high-pressure hydrogen storage tank to said hydrogen supply nozzle;
    holding means for holding said hydrogen supply nozzle;
    detecting means mounted on said holding means for detecting whether said hydrogen supply nozzle is held by said holding means or not;
    cooling means for cooling said hydrogen tank, wherein said cooling means comprises:
        coolant ejecting means for ejecting a coolant toward said hydrogen tank;
        a coolant supply source for supplying said coolant to said coolant ejecting means;
        a coolant supply pipe connecting said coolant supply source and said coolant ejecting means to each other, wherein said coolant is supplied through said coolant supply pipe from said coolant supply source to said coolant ejecting means; and
        a valve connected to said coolant supply pipe; and
    control means for controlling said cooling means to perform a cooling operation on said hydrogen tank depending on a detected result from said detecting means, wherein said control means comprises a valve controller for controlling said valve to selectively open and close said coolant supply pipe.

2. A hydrogen tank filling station according to claim 1, wherein said hydrogen tank comprises a hydrogen tank mounted on a vehicle, and said cooling means cools said hydrogen tank from a location underneath said vehicle.

3. A hydrogen tank filling station according to claim 1, wherein said coolant comprises water or air.

* * * * *